Dec. 20, 1927.

C. D. CONNALLY 1,653,203

WATER TRAP FOR AIR BRAKE EQUIPMENT

Filed Dec. 6, 1926

C. D. Connally,
INVENTOR.

BY John M. Spellman
ATTORNEY.

Patented Dec. 20, 1927.

1,653,203

UNITED STATES PATENT OFFICE.

CHARLES D. CONNALLY, OF FORT WORTH, TEXAS.

WATER TRAP FOR AIR-BRAKE EQUIPMENT.

Application filed December 6, 1926. Serial No. 152,766.

This invention has relation to improvements in air brake equipment and specifically to a train line water trap, the object being to provide a trap for collecting water and dirt in the form of dust particles drawn in with the air when the brakes are charged. It is very desirable to keep dirt and dust out of the valves of the train line in order to prevent the brakes from sticking.

Another object of the invention is to provide a train line water trap of compact and practical construction and of economical manufacture.

With the above and other objects in view the invention will be clearly understood from a perusal of the following description in connection with the accompanying drawings and wherein.

Figure 1:
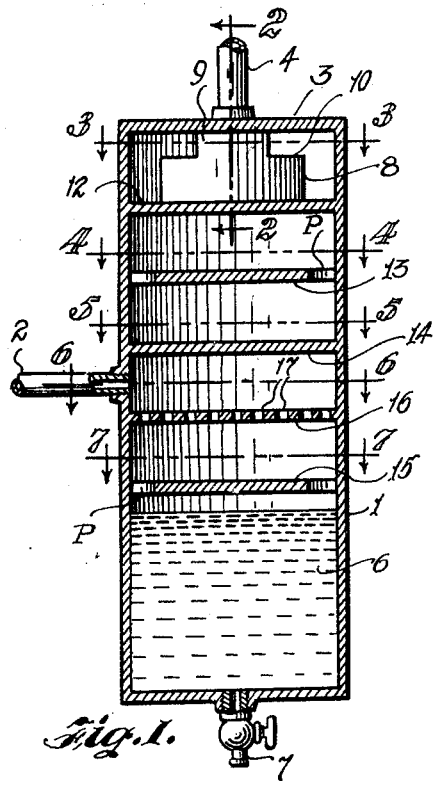
Figure 1 is a vertical sectional view of the trap comprising the invention.

Proceeding more in detail with the drawing wherein numerals are used to designate the various parts, 1 denotes the body of the trap which is cylindrical in shape. An opening is provided at approximately the center of the tank for connection of an air pump inlet pipe 2. In the top 3 of the tank or trap is an air pipe 4 which is connected in the train line. The trap has a cock 7 for draining the water 6 collected in the bottom thereof from time to time.

In the upper part of the trap is a divider 8 of semi-circular shape, having a neck 9. This divider is welded or otherwise fastened to the top of the tank by the neck 9 and its sides are connected to the walls of the tank or trap, leaving ports 10 for the passage of air.

The bottom edges of the divider are connected by welding or otherwise to a breaker 12. Spaced apart from the top breaker 12 are similar breakers 13, 14 and 15 for causing the air to travel in a tortuous winding course through the trap. These breakers are preferably welded to the body 1. The breaker 12 has a hole $9^a$ for outlet of water which might collect at this point.

Intermediate the breakers 14 and 15 is a sieve 16, with perforations 17 for the purpose of preventing water collected in the bottom of the trap from being siphoned from the trap while the train brakes are being applied.

Figure 3:
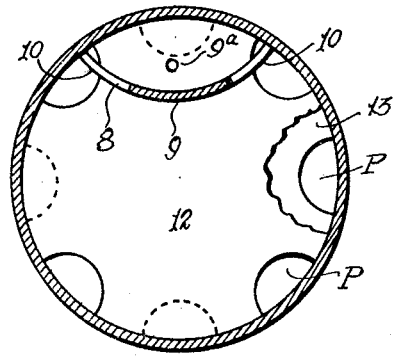
Figures 3, 4, 5, 6 and 7 are cross-sectional views respectively along the lines indicated by the figures similarly related to the views.
Figure 4:
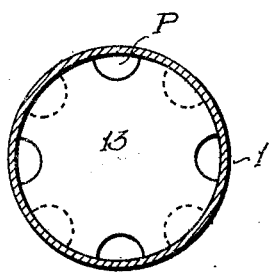
Figure 5:
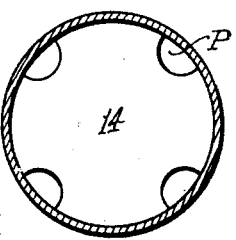
Figure 2:
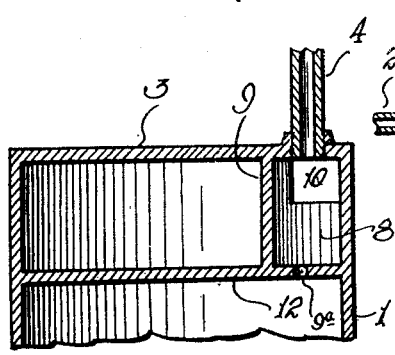
Figure 2 is an enlarged detail sectional view of the upper part of the trap, the view taken along line 2—2 of Figure 1.
Figure 6:
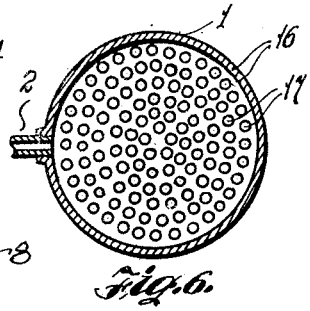
Figure 7:
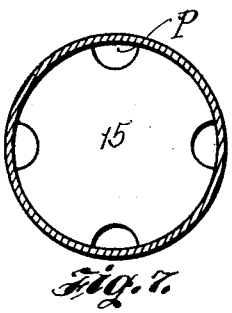

Reference being now made to Figures 3, 4, 5 and 7, each breaker is provided with ports P for air passage. These ports of adjacent breakers as will be observed from the drawing are not disposed in direct opposite relation with each other. For instance the ports in the breaker 12 are not in alinement with the ports in breaker 13, but occupy a different position, so that the air will pass in a circuitous travel through the breakers in the trap.

From the above it is apparent that the invention provides a capable trap for the purpose intended. This form of trap can be installed on all locomotives at a very small cost and will maintain the triple valves of the train equipment in perfect working order. The present construction of trap permits about one-half gallon of water to be trapped before the necessity of draining the trap. It will also collect the greater part of the dust and dirt drawn into the train pipe.

It should be understood that changes and modifications may be made in the construction and arrangement of the invention, in keeping with the appended claims.

What is claimed is:

1. A train line water and dust trap for air brake equipment comprising a tank with an air inlet from an air compression source, an air outlet to the train line, a drain cock; air inlet ports and air circulating ports and a sieve member.

2. A train line water and dust and dirt collecting trap comprising a tank having a water-collecting space, an air inlet, an air outlet; a divider adjacent said air outlet port to the train line provided with air ports; a series of spaced breaker plates in the tank intermediate its ends with air ports and a sieve member interposed between certain of said plates to prevent siphoning of water collected in said water space.

3. A train line water and dirt-collecting trap as set out in claim 2, said divider seated upon the uppermost of said plates and curved and connected to the sides of the tank and including an upwardly projecting portion comprising a neck, said neck joining the top of the tank and an air dividing port on each side of the neck.

4. A train line water and dirt-collecting trap as set out in claim 2 said breaker plates having spaced apertures comprising air circulating ports; the ports in each plate arranged in staggered relationship with the adjacent plates, to cause the air to travel a tortuous route through the tanks.

5. A train line water and dirt-collecting trap as set out in claim 2, said sieve spaced apart between certain of said breaker plates and provided for the purpose of preventing water collected in the trap from being sucked and drawn out when the air brakes of the train are applied.

In testimony whereof I affix my signature.

CHARLES D. CONNALLY.